Jan. 12, 1960 W. C. LANNING 2,920,825

BINARY SUBTRACTER

Filed June 23, 1955 2 Sheets-Sheet 1

INVENTOR
WALTER C. LANNING
BY [signature]
ATTORNEY

INVENTOR
WALTER C. LANNING
BY
R. V. Craddock
ATTORNEY

United States Patent Office 2,920,825
Patented Jan. 12, 1960

2,920,825

BINARY SUBTRACTER

Walter C. Lanning, Plainview, N.Y., assignor to Sperry Rand Corporation, a corporation of Delaware Application June 23, 1955, Serial No. 517,447
20 Claims. (Cl. 235—176)

This invention concern a subtraction circuit for a binary digital computer, and more particularly, a circuit for performing the operation of subtraction on two binary digital numbers in the series mode, each number being represented by a train of electrical pulses.

In the operation of subtraction on two binary digital numbers in the series mode, the minuend and subtrahend are considered digit by digit beginning with the least significant digits and a separate operation of substraction is performed on each pair of corresponding digits. In performing the operation of subtraction in the *n*th corresponding digits of the two numbers, the borrow term from the subtraction operation of the $(n-1)$th corresponding digits must be included to obtain the correct results.

A binary digital number may be represented by a train of electrical signals uniformly spaced in time wherein the presence of a pulse designates the number 1 and the absence of a pulse designates the number 0. A circuit for performing the operation of subtraction on two numbers in binary digital form, each so represented, must perform the operation of subtraction by proper electrical combination of simultaneous signals of the trains representing the numbers. The circuit must also include in the operation of subtraction the borrow term from the immediately preceding operation of subtraction. The output from the circuit must be a train of electrical signals representing in binary digital form the difference of the two numbers subtracted and a train of electrical signals representing in binary digital form the borrow term of the numbers subtracted. Furthermore, the circuit must provide means for storing this borrow term and releasing it for use on the next succeeding subtraction of corresponding pulses in the train.

It is, therefore, a object of this invention to provide an electrical computing circuit for performing the operation of subtraction on two binary digital numbers represented by a train of electrical pulses.

It is a further object of this invention to provide an electrical computing circuit for obtaining the difference between corresponding order digits of two binary numbers minus the borrow term from the immediately preceding order digit subtraction.

It is a further object of this invention to provide an electrical computing circuit for performing the operation of subtraction on two binary digital numbers in the series mode.

It is a further object of this invention to provide a digital computer circuit for subtracting from a first binary digital number a second binary digital number, said numbers being respectively represented by first and second trains of electrical pulses.

In this invention, a pair of electrical pulse trains representing in binary digital form the minuend and the subtrahend are coupled to the input terminals of an Exclusive-OR logical element. The output signals of the Exclusive-OR logical element represent an Exclusive-OR operation and the NOT of an Exclusive-OR operation on simultaneous digits of the pulse trains representing the two numbers to be subtracted. The pulse train representing the NOT of the minuend and the pulse train representing the subtrahend are also coupled to a logical element whose output signal represents a Disjunctive operation on simultaneous digits of these two pulse trains. A storage means is provided for storing the borrow term of the immediately preceding digit subtraction and for supplying as output signals this borrow term and the NOT of this borrow term. The output signals of the Exclusive-OR logical element and the borrow term output signals of the storage means are combined and coupled to an Equivalence logical element whose output signal represents the difference between the numbers to be subtracted. The signal representing the NOT of the borrow term, the Exclusive-OR output signal of the Exclusive-OR logical element, and the Disjunctive signal are combined in another logical element which performs a Disjunctive operation on its input signals. The output signal of this logical element represents the borrow term of the numbers currently being subtracted. This borrow term is fed to the storage means for use in the operation of subtraction performed on the next succeeding corresponding digits.

Other objects and advantages of the present invention will become apparent from the specification taken in connection with the accompanying drawings, wherein.

Figures 1, 2, 3:
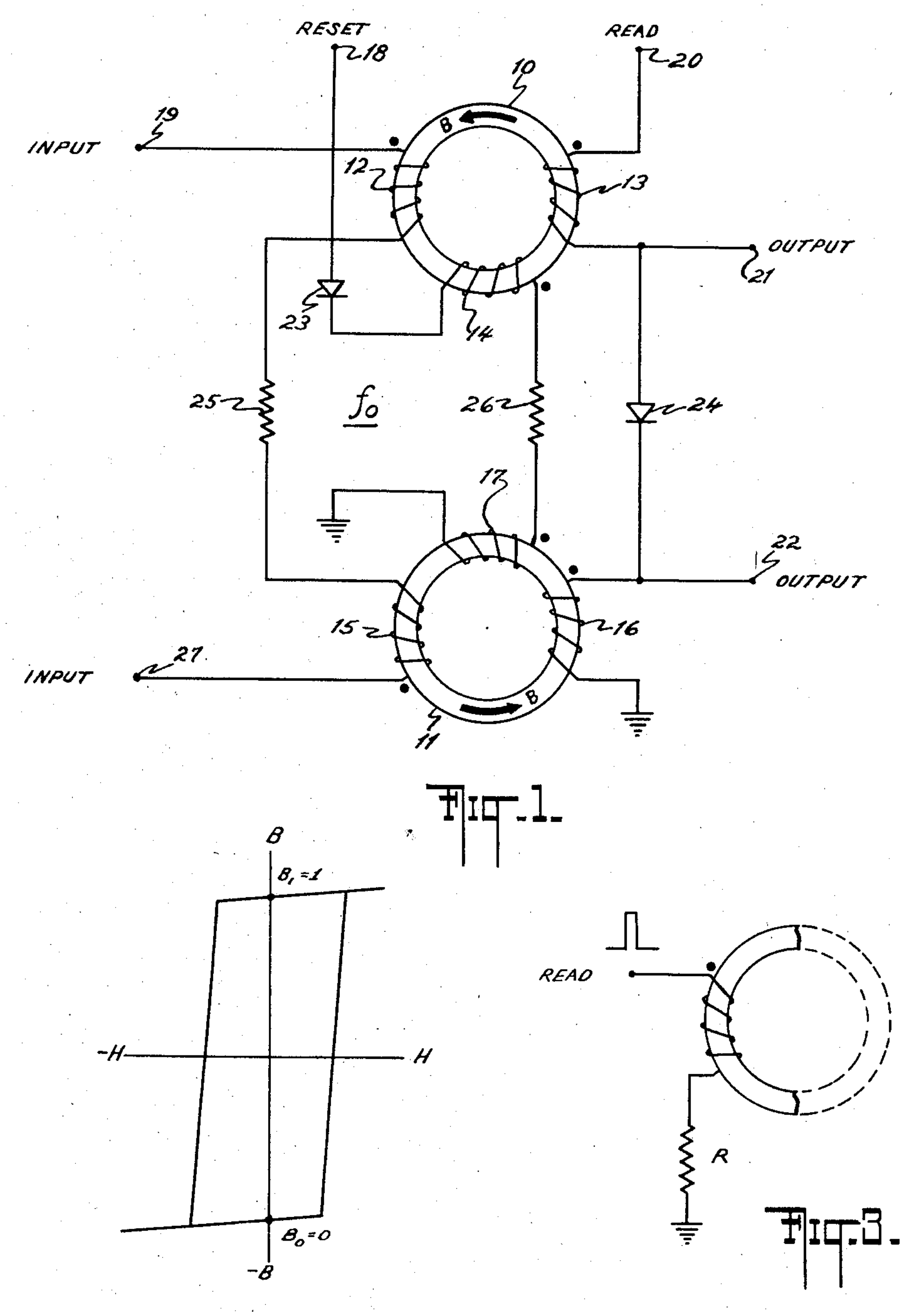
Fig. 1 is a schematic diagram of a circuit element suitable for use in this invention.
Fig. 2 is a graph illustrating a hysteresis loop of a magnetic material used in the element of Fig. 1.
Fig. 3 is a circuit used to illustrate the operation of the element of Fig. 1.

In the following description and claims certain of the mathematical operations which are peculiarly applicable to binary digital computation may be defined as follows:

Conjunction—Yields a 1 out if both inputs are 1.

| | | B | |
|---|---|---|---|
| | | 0 | 1 |
| A | 0 | 0 | 0 |
| | 1 | 0 | 1 |

This operation is performed by a Conjunctive logical element.

Disjunction—Yields a 1 out if either input is 0.

| | | B | |
|---|---|---|---|
| | | 0 | 1 |
| A | 0 | 1 | 1 |
| | 1 | 1 | 0 |

This operation is performed by a Disjunctive logical element.

Equivalence—Yields a 1 out if the inputs are alike.

| | | B | |
|---|---|---|---|
| | | 0 | 1 |
| A | 0 | 1 | 0 |
| | 1 | 0 | 1 |

This operation is performed by an Equivalence logical element.

Exclusive-OR—Yields a 1 out if the inputs are unlike.

| | | B = 0 | B = 1 |
|---|---|---|---|
| A | 0 | 0 | 1 |
| | 1 | 1 | 0 |

This operation is performed by an Exclusive-OR logical element.

Adjunction—A term generic to Conjunction and to Disjunction. Thus the term Adjunctive logical element covers a logical element that performs one of these operations and also covers a logical element that performs both of these operations.

NOT—Yields the opposite digit or number of the digit input. Whereas the aforementioned logical elements perform a mathematical operation in combining two binary digital numbers, the NOT logical element operates on a single binary digital number. Thus, if the input to a NOT logical element is 1, the output is 0, and vice versa.

To subtract two binary digital numbers in the series mode, the numbers to be subtracted are considered digit by digit beginning with the least significant digit and a separate operation of subtraction is performed on each pair of corresponding digits. In the subtraction of the *n*th corresponding digits of the two numbers, the borrow term from the subtraction operation of the $(n-1)$th corresponding digits is included in the subtraction in order to obtain the correct result. Thus, the operation of subtraction on two binary digital numbers in the series mode must conform to the following truth table:

| $A_n$ | $B_n$ | $C_{n-1}$ | $\Delta_n$ | $C_n$ |
|---|---|---|---|---|
| 0 | 0 | 0 | 0 | 0 |
| 1 | 0 | 0 | 1 | 0 |
| 0 | 1 | 0 | 1 | 1 |
| 1 | 1 | 0 | 0 | 0 |
| 0 | 0 | 1 | 1 | 1 |
| 1 | 0 | 1 | 0 | 0 |
| 0 | 1 | 1 | 0 | 1 |
| 1 | 1 | 1 | 1 | 1 |

In this table $A_n$ and $B_n$ represent respectively *n*th corresponding digits of the minuend and subtrahend. The term $C_{n-1}$ represents the borrow term from the operation of subtraction performed on the $(n-1)$th corresponding digits. The difference term is represented by $\Delta_n$ and the borrow term is represented by $C_n$. The borrow term $C_n$ is used in performing the operation of subtraction on the $(n+1)$th corresponding digits.

In order to construct a computer which will perform the operations demanded by the truth table and which will thereby act as a subtracter, equations representing the operations in the table must be formulated. Boolean algebra, a branch of mathematics well suited to express mathematical relationships in a binary number system, will be employed here. An equation formulating the conditions under which the difference term $\Delta_n$ is unity, as shown in the truth table is as follows:

$$\Delta_n = A_nB_n'C'_{n-1} + A_n'B_nC_{n-1}' + A_n'B_n'C_{n-1} + A_nB_nC_{n-1} \quad (1)$$

In this notation, the primed symbols indicate the NOT of the unprimed symbols. Thus, the first term to the right of the equality sign yields a 1 if $A_n$ is 1 and $B_n$ is not 1 and $C_{n-1}$ is not 1. If any of the four terms to the right of the equality sign are 1, $\Delta_n$ is 1.

Equation 1 may be reduced and simplified according to the following steps:

$$\Delta_n = C_{n-1}'(A_nB_n' + A_n'B_n) + C_{n-1}(A_n'B_n' + A_nB_n) \quad (2)$$

$$\Delta_n = C_{n-1}'(A_n'B_n' + A_nB_n)' + C_{n-1}(A_n'B_n' + A_nB_n) \quad (3)$$

The term within the parenthesis yields a 1 if $A_n$, $B_n$, are both 1 or both 0; therefore, the term within the parenthesis represents an Equivalence operation on the numbers $A_n$, $B_n$. Consequently, letting, $$X_n = A_n'B_n' + A_nB_n \quad (4)$$

the following equation is obtained:

$$\Delta_n = C_{n-1}'X_n' + C_{n-1}X_n \quad (5)$$

in which the term $X_n$ represents an Equivalence operation on the numbers $A_n$, $B_n$.

In a similar manner, an expression for the term $C_n$ may be formulated from the truth table according to the following equation:

$$C_n = A_n'B_nC_{n-1}' + A_n'B_n'C_{n-1} + A_n'B_nC_{n-1} + A_nB_nC_{n-1} \quad (6)$$

This equation may be further reduced:

$$C_n = C_{n-1}(A_n'B_n' + A_nB_n) + A_n'B_n(C_{n-1}' + C_{n-1}) \quad (7)$$

$$C_n = C_{n-1}(A_n'B_n' + A_nB_n) + A_n'B_n \quad (8)$$

Once more substituting the term $X_n$ for the Equivalence operation on the numbers $A_n$ and $B_n$, and then simplifying the resulting equation in order to more readily construct the computer, there results:

$$C_n = C_{n-1}X_n + A_n'B_n \quad (9)$$

$$C_n = [(C_{n-1}' + X_n')(A_n'B_n)']' \quad (10)$$

Equation 10 is not in its simplest form. It can be reduced to:

$$C_n = A_n'B_n + A_n'C_{n-1} + B_nC_{n-1} \quad (11)$$

However, Equation 10 is more useful than Equation 11 since it is written as a function of $X_n'$.

Equations 5 and 10 express mathematically the means by which the computer of this invention performs the operation of subtraction on two binary digital numbers in the serial mode. Thus, to obtain the difference term $\Delta_n$, it is first necessary to generate the Exclusive-OR term $X_n'$ and the Equivalence term $X_n$ from the two corresponding input digits $A_n$, $B_n$. An Equivalence operation is then performed on the Equivalence term $X_n$ and on the previous borrow term $C_{n-1}$, the operation yielding the difference term $\Delta_n$, as shown in Equation 5. Equation 10 indicates that the borrow term may be generated by first performing a Conjunctive operation on the binominal of the NOT of the previous borrow term OR the Exclusive-OR operation term and the Disjunctive operation on $A_n'$, $B_n$ and then performing a NOT operation on the result.

A circuit element which is suitable for use in a binary digital computing circuit and which facilitates assemblage of the instant subtracter according to the principles formulated in Equations 5 and 10 is shown in Fig. 1. For purposes of simplicity, this circuit element will henceforth be termed a functor. The functor comprises a pair of toroidal magnetic cores 10 and 11, on each core there being wound an input, an output, and a reset winding. Input winding 12, output winding 13, and reset winding 14 are wound on core 10. Input winding 15, output winding 16, and reset winding 17 are wound on core 11. Windings 12 and 15 are series connected forming a current path between input terminals 19 and 27. Input signal current enters one of these terminals which may be termed the "current-in input terminal," and after passing through windings 12 and 15 leaves through the other input terminal, which may be termed the "current-out input terminal." The magnetization effect of each winding on its core is indicated by the presence of a dot near one end or terminal of the winding. Positive current entering the dotted terminal of any winding tends to set up magnetic flux in the core in the arbitrarily assigned positive direction, as shown by the arrows.

An idealized hysteresis loop of the cores of the functor is shown in Fig. 2. These cores have the property of low coercive force and high residual magnetism. A core may be readily magnetized with a given direction of residual magnetic field or into a given remanence state by applying sufficient current of proper polarity to any of its windings to drive the core to saturation. A core is magnetized into the defined unity remanence state by applying positive saturating current to the dotted terminal of any of its windings. Similarly, a core is magtized into the zero remanence state by applying positive saturating current to the undotted terminal of any of its windings. Thus, if a core is in the zero state, a large positive pulse of current entering the dotted terminal of any one of its windings is sufficient to change the remanence state from zero to unity. On the other hand, with the core in the zero state, if the positive pulse of current enters the winding at the undotted terminal, no change of remanence state occurs and the core will remain magnetized in the zero state.

To illustrate how pulses are read out of the functor, the exemplary circuit of Fig. 3 is used. In this circuit a coil wound on a magnetic core, such as is used in the functor, is shown in series with a resistance. If the core is in the zero remanence state, a positive pulse of current applied to the read terminal enters the winding at its dotted end and passes through the resistor to ground. The pulse of current tends to change the state of the core from zero to one and the residual magnetism from $B_0$ to $B_1$. This attempted change of flux through its turns will induce a voltage in the winding, causing it to act as a high impedance. Thus, most of the voltage applied to the read terminal will appear across the winding and but a very small portion across the resistor. If the core is magnetized in the unity remanence state, a positive pulse of current applied to the dotted terminal of the coil tends to cause no change of remanence state. Consequently, there will be but little voltage induced in the winding, and it acts as a low impedance, so that most of the voltage applied to the read terminal will appear across the resistor.

The appearance of a pulse across the resistor of Fig. 3 occurs when the core is in a unity state. Hence, the output pulse on the resistor when the core is in the unity state may be considered to be an output of unity. The absence of an output pulse when the core is in the zero state may be considered to be an output of zero. Therefore, in this functor and in its associated circuitry, the presence of a pulse indicates the presence of the digit 1 and the absence of a pulse the presence of the digit 0.

The windings of the functor are energized by positive pulses from a clock source. The clock source delivers periodic trains of pulses at a plurality of terminals. While the periods of all pulse trains are alike, the pulses in different trains are displaced in time. The functor reset terminal 18 and read terminal 20 are connected directly to different terminals of the clock source. The input terminal 19 is connected to another terminal of the clock source either directly or through intermediate circuitry which may or may not permit passage of the particular clock pulse to the input terminal 19. It is necessary that the terminals of the clock source be so selected that the cyclical order of pulses energizing the functor windings follow the pattern of reset, input, and read.

The clock pulses applied to reset terminal 18 enter reset winding 14 at its undotted end and reset winding 17 at its dotted end, thereby setting core 10 to 0 and core 11 to 1. A positive pulse applied to input terminal 19 enters input winding 12 at its dotted end and input winding 15 at its undotted end. If no input pulse reaches input terminal 19 during a particular clock cyle, the cores remain in their reset state. However, if a pulse enters input terminal 19, core 10 is set to 1 and core 11 is set to 0.

A pulse applied to the read terminal 20 enters winding 13 at its dotted end. Output terminal 21 acts only as a current source. If core 10 is set to 0, the output winding 13 acts as a high impedance and little current can flow from output terminal 21. Thus, the output signal from output terminal 21, will be a 0 in accordance with the principles explained in connection with Fig. 3. If core 10 is set to 1, the output winding 13 acts as a low impedance and an output pulse, representing the number 1, will appear at output terminal 21.

Output terminal 22, which acts only as a current sink, is connected through intermediate circuitry to the same terminal of the clock source as read terminal 20. With core 11 set to 0, output winding 16 acts as a high impedance and prevents current flow in the intermediate circuitry. Thus, the signal from the terminal 22 may be said to be a 0. If core 11 is set to 1, output winding 16 acts as a low impedance and permits current to flow in the intermediate circuit connected to terminal 22. Thus, the signal from terminal 22 may be said to be a 1.

Summarizing the above analysis, if the input signal to the functor is 1, the output signal of terminal 21 is 1, and the output signal of terminal 22 is 0. On the other hand, if the input signal is 0, the output signal from terminal 21 is 0, and the output signal from terminal 22 is 1. The electrical significance of such a result is that with an input of 1, the functor will deliver a pulse at one output terminal, but will not allow reception of a pulse at the other output terminal. If the input is 0, the functor will deliver no pulse at one output terminal, but will allow reception of a pulse at the other output terminal. A functor which operates in this manner is designated a functor zero.

If the output windings of the two cores are each wound in the opposite direction from that of Fig. 1, the functor will perform in an opposite manner. In this case, an input 1 will yield an output of 0 at terminal 21 and an output of 1 at terminal 22. Again expressing its operation electrically, if the input is 1, the functor will not deliver an output pulse at one output terminal, but will allow reception of a pulse at the other output terminal. Such a functor is designated as a functor one.

In its use in a computing circuit a functor is interconnected with other funtors. Thus, in the functor of Fig. 1, the input terminal 19 is connected to a current source output terminal of a preceding functor, and since current flows into it, terminal 19 is the current-in input terminal. Input terminal 27 is connected to a current sink output terminal of a preceding functor, and since current flows out of it, terminal 27 is the current-out input terminal. Similarly, output terminals 21 and 22 are connected to input terminals of succeeding functors. Thus, input windings 12 and 15 are in series with each other and in series with a preceding current source output terminal and a preceding current sink output terminal. Only if both the preceding current source and the preceding current sink generate an output signal of 1 does a current pulse flow in the input windings 12 and 15. If either or both of the preceding functors generates an output signal of 0, a 0 signal will be applied to the input windings 12 and 15. Thus, the functor zero of Fig. 1 yields a 1 at its current source terminal output 21 only if both inputs are 1, and, therefore, acts basically as a Conjunctive logical element.

In similar manner, the functor one yields a 1 at its current source output terminal if the inputs are either 1–0 or 0–1, or both 0, and, therefore, acts basically as a Disjunctive logical element.

Figure 4:
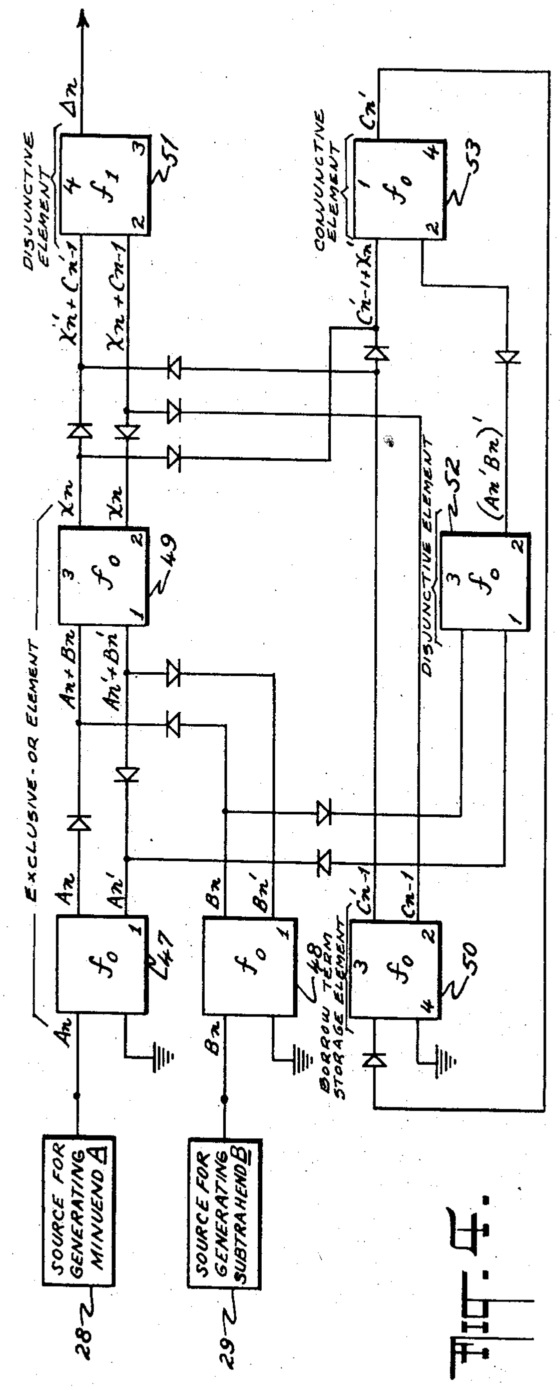
Fig. 4 is a circuit diagram of the preferred subtracting circuit of this invention.

The subtracting circuit of this invention, as shown in Fig. 4, is constructed by proper interconnection of a plurality of functor elements of the type described. In this figure the functor elements are shown as blocks having four terminals, the two terminals on the left of each block representing the input terminals and the two terminals on the right representing the output terminals. The upper and lower input terminals are respectively the current-in and current-out input terminals. The upper output terminal is the current source terminal and the lower output terminal is the current sink terminal. This circuit is capable of subtracting from a first binary digital number A a second binary digital number B, both in the series mode, and each number being represented by a train of electrical pulses, and of delivering at an output terminal a single binary digital number in the series mode, represented by a train of electrical pulses, which is the difference between the numbers A and B. The circuit operates according to the principles formulated in Equations 5 and 10.

Figure 5:
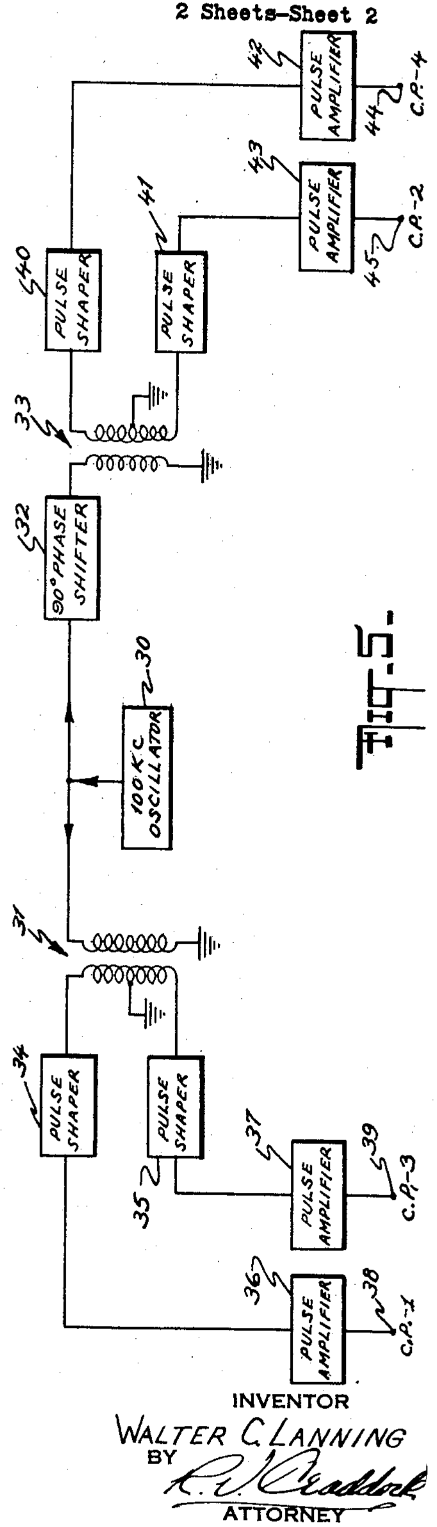
Fig. 5 is a schematic diagram of a clock source to be used in conjunction with the circuit of Fig. 4.

A clock source for delivering positive pulses to the reset, input, and output windings is shown in Fig. 5. The clock source delivers four clock pulses spaced 90° apart during one clock cycle, the clock cycles recurring at 100 kc. A 100 kc. oscillator 30 determines the recurrence frequency of the clock pulses. The output signal of oscillator 30 is split into two portions, one portion being applied to the primary winding of a transformer 31 and the other portion, after being delayed by 90° in phase shifter 32, being applied to the primary winding of a transformer 33. The secondary winding of transformer 31 is center tapped in order to provide two signals, one from each end of the secondary winding, 180° out of phase with each other. The two signals from the secondary winding of transformer 31 are passed through respective pulse shaper networks 34 and 35 and respective pulse amplifiers 36 and 37 to clock pulse terminals 38 and 39. The secondary winding of transformer 33 is center tapped in order to provide two signals, one from each end of the secondary winding, 180° out of phase with each other, and also 90° out of phase with respect to corresponding signals delivered by the secondary winding of transformer 31. The two signals from the secondary winding of transformer 33 are passed through respective pulse shaper networks 40 and 41 and respective amplifiers 42 and 43 to clock pulse terminals 44 and 45. Thus, the output of the clock source is a series of recurring positive pulses from each of four output terminals. The pulse recurrence frequency of the signal from each terminal is 100 kc. One pulse is delivered from each of the terminals during each cycle of oscillator 30. The clock pulses are delivered in cyclical order from terminals 38, 45, 39, and 44. Terminals 38, 45, 39 and 44 are respectively labeled CP–1, CP–2, CP–3 and CP–4 to indicate the cyclical order of the clock pulse available at that terminal.

Referring again to Fig. 4, in the block representing each functor is a series of numerals representing clock pulse numbers. The numeral in the lower left corner indicates the number of clock pulse which energizes the input windings of the functor. The numeral in the lower right corner indicates the number of the clock pulse which energizes the output windings of the functor. The numeral in the top center portion of the block indicates the number of the clock pulse which resets the functor cores.

In operation, a pair of electrical pulse trains representing respectively the binary digital minuend A and the binary digital subtrahend B, both in the series mode, are generated in respective sources 28, 29, which may be preceding computer circuits. These pulse trains are applied to input terminals of respective functors 47 and 48. The particular digits entering the input terminals are designated $A_n$, $B_n$. The other input terminal of each of functors 47 and 48 is connected to ground, thereby providing a ready path through both input windings of each functor for all pulses which appear in the applied pulse trains. Functors 47 and 48 are both of the functor zero type, so that the signals at their current source output terminals represent a Conjunctive operation on the input signals to each functor. Because of the ground connection, one of the input signals to each of functors 47 and 48 is always 1. Since the Conjunctive operation on any number and unity is that number, the signals from the current source output terminals of functors 47 and 48 will be respectively $A_n$, $B_n$. The signals from the current sink output terminals of functors 47 and 48 will be respectively the NOT of $A_n$, $B_n$; that is, $A_n'$, $B_n'$.

The current source output terminals of functors 47 and 48 are connected in parallel to one input terminal of a functor 49, which is a functor zero. Thus, the signal to this terminal, as shown, is the mathematical operation $A_n$ OR $B_n$. The current sink output terminals of functors 47 and 48 are connected in parallel to the other input terminal of functor 49. The signal to this terminal is $A_n'$ OR $B_n'$.

Functor 49, being of the functor zero type, performs a Conjunctive operation on the signals applied to its input terminals. This Conjunctive operation is formulated in the following equation, $$(A_n+B_n)(A_n'+B_n') \qquad (12)$$

which may be reduced to the following simplified expression, $$A_nB_n'+A_n'B_n=X_n' \qquad (13)$$

Equation 13 states that functor 49 yields a one out if the digits $A_n$, $B_n$ are unlike. This result is an Exclusive-OR operation on the digits $A_n$, $B_n$, and is represented by the symbol $X_n'$, because the Exclusive-OR operation is the NOT of the Equivalence operation, which was designated by the symbol $X_n$ in Equation 4. This exclusive-OR operation yield is delivered at the current source output terminal of functor 49. The NOT yield of this Exclusive-OR operation is delivered at the current sink output terminal of functor 49. However, since the NOT of an Exclusive-OR operation is an Equivalence operation, it is seen that both the Exclusive-OR and Equivalence operations on the numbers $A_n$, $B_n$ are available at the output terminals of functor 49.

Referring to the clock pulse numerals for functors 47, 48 and 49, if the output signals are read out of functors 47 and 48 and into functor 49 on clock pulse 1, the output of functor 49 may be read out on a succeeding clock pulse, such as clock pulse 2.

The borrow term $C_{n-1}$ from the preceding digit subtraction has been stored in a functor 50, which is of the functor zero type, and is available for use after the signals $A_n$, $B_n$ have been introduced into the system. The NOT of the preceding borrow term is available at the current source output terminal of functor 50 and the preceding borrow term is available at the current sink output terminal. The current source output terminals of functors 49 and 50 are connected in parallel to one input terminal of a functor 51, which is a functor one, the input signal to that terminal being $X'_n$ OR $C'_{n-1}$. The current sink output terminals of functors 49 and 50 are connected in parallel to the other input terminal of functor 51, the input signal to that terminal being $X_n$ OR $C_{n-1}$. Functor 51 performs a Disjunctive operation on the two input signals, this operation being represented in the following expression, $$[(X'_n+C'_{n-1})(X_n+C_{n-1})]' \qquad (14)$$

which may be simplified as follows, $$C'_{n-1}X'_n+C_{n-1}X_n=\Delta_n \qquad (15)$$

However this equation is the same as Equation 5. Thus, the signal available at the current source output terminal of functor 51 represents an Equivalent operation on the digits $X_n$, $C_{n-1}$ and is the desired difference term of the subtracter.

In order to complete the operation of subtraction it is necessary to generate a borrow term for use on the digit subtraction of the terms of next higher significance. This is accomplished by interconnecting additional functors to perform the mathematical operation described in Equation 10.

A functor 52 is used for producing an intermediate operation useful in generating the borrow term. The current sink output terminal of functor 47 is connected to one input terminal of functor 52 and the current source output terminal of functor 48 is connected to the other input terminal of functor 52, functor 52 being of the functor zero type. Thus, functor 52 stores a term representing a Conjunctive operation on $A'_n$, $B_n$. However, the signal available at the current sink output terminal of functor 52 is the NOT of this Conjunctive operation, or Disjunction, and may be written as $(A'_nB_n)'$. The purpose of functor 52 is to store this operation on the output signal signals from functors 47 and 48 in order to make it available for use when the signals from functors 49 and 50 are read out while generating the difference signal. Thus, on clock pulse 2 the output signals of functors 49, 50 and 52 are applied to a functor 53 for generating the borrow term. The current source output terminals of functors 49 and 50 are connected in parallel to one input terminal of functor 53, the input signal to that terminal being $C'_{n-1}$ OR $X'_n$. The current sink output terminal of functor 52 is connected to the other input terminal of functor 53. Functor 53 is of the functor zero type and therefore its output signal available at its current source output terminal is a Conjunctive operation on the two input signals. However, this Conjunctive operation by functor 53 is the NOT of that of Equation 10, which equation was that of the borrow term. Consequently, the output signal from the current source output terminal of functor 53 is the NOT of the borrow term of the two digits being subtracted.

Both the difference terms and the borrow terms were stored in respective functors 51 and 53 on clock pulse 2. The difference term may therefore be read out of functor 51 on either the third or fourth clock pulses in the clock cycle, although it is preferable to read out the difference term on the third clock pulse to obtain speediest operation of the computer. The same latitude is not available in reading out the borrow term from functor 53. This is due to the fact that functor 50 which is to store this borrow pulse is not reset and available for an input signal until after clock pulse 3. Consequently, the borrow term must be read out of functor 53 and into functor 50 on clock pulse 4 by means of a connection between the current source output terminal of functor 53 and an input terminal of functor 50.

While the functors used and their interconnections described in reference to the circuit of Fig. 4 represents the preferred embodiment of this invention, many modifications may be made in the circuit without departing from the spirit of this invention. Thus, functors 47 and 48 may both be of the functor one type. In such case, if their current source output terminals are connected in parallel into one input terminal of functor 49 and their current sink output terminals are connected in parallel to the other input terminal of functor 49, the signals available at the output terminals of functor 49 remain unchanged from those of Fig. 4. However, in order to generate the borrow term $C_n$, it is necessary to connect the current source output terminal of functor 47 to one input terminal of functor 52 and the current sink output terminal of functor 48 to the other input terminal of functor 52. With these connections, there is again available at the output of functor 52 a signal representing a Disjunctive operation on $A'_n$, $B_n$.

Functors 47 and 48 may also be unlike, that is one of these may be a functor zero and the other a functor one. With the current source output terminals of functors 47 and 48 connected in parallel to one input terminal of functor 49 and their current sink output terminals connected in parallel to the other input terminal of functor 49 the Disjunctive operation on the input signals to functor 49 represents an Exclusive-OR operation on $A_n$, $B_n$. Thus, the signals available at the output terminals of functor 49 will represent Exclusive-OR and Equivalence operations on $A_n$, $B_n$, whether functor 49 is of the functor zero or the functor one type. In order to generate the borrow term, the signals $A_n$, $B'_n$, must be coupled to one input terminal of functor 52, the other input terminal either going to ground or to the clock pulse 1 terminal of the clock source. In this manner the signal $(A'_nB_n)'$ is available at the output terminal of functor 52, regardless of the type functor used.

In a similar manner functors 50 and 53 can be of either type since the particular borrow term may be selected at an appropriate output terminal of each element.

Functor 51 may be of either type since the difference term would be available at one of its two output terminals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a digital computer for subtracting from a first binary digital number a second binary digital number, said numbers having corresponding order digits respectively represented by first and second electrical signals, a circuit comprising a binary logical element having input terminals, an Exclusive-OR output terminal and an Equivalence output terminal, one of said output terminals being a current-source terminal, the other being a current-sink terminal said first and second signals being applied to said input terminals; storage means for storing the borrow term of the immediately preceding order digit subtraction and for supplying as output signals at respective output terminals said borrow term and the NOT of said borrow term one of said storage output terminals being a current source terminal, the other being a current-sink terminal; first, second and third Adjunctive logical elements each having an input circuit including a current-in input terminal and a current-out input terminal, and an output circuit including a current sink output terminal, means for applying signals representing said second electrical signal and the NOT of said first electrical signal to the input circuit of said first Adjunctive logical element, whereby the signal at one of the output terminals thereof represents a Disjunctive operation on corresponding order digits of said second number and the NOT of said first number; the Exclusive-OR output signal of said binary logical element and the NOT of the borrow signal of said storage means being applied in parallel to one input terminal of said second Adjunctive logical element, and the last said output terminal of said first Adjunctive logical element being connected to another input terminal of said second Adjunctive logical element, whereby the signal from one of the output terminals of the second Adjunctive logical element represents the borrow term of the digits being subtracted; the Exclusive-OR output signal of said binary logical element and the NOT of the borrow signal of said storage means being applied in parallel to one input terminal of said third Adjunctive logical element, and the Equivalence output signal of said binary logical element and the borrow output signal of said storage means being applied in parallel to another input terminal of said third Adjunctive logical element, whereby the signal from an output terminal of said third Adjunctive logical element represents the difference between said corresponding order digits of said first and second numbers minus the borrow term of the immediately preceding order digit subtraction, the aforesaid connections between output terminals and input terminals of respective logical elements being further characterized in that current-source output terminals are connected only to current-in input terminals and current-sink output terminals are connected only to current-out input terminals.

2. The computer circuit of claim 1 including means for connecting the output circuit of said second Adjunctive logical element to said storage means.

3. A digital computer circuit for subtracting from a first binary digital number a second binary digital number, the said numbers being respectively represented by first and second electrical signals, said circuit including a plurality of logical elements each having an input circuit including a current-in input terminal and a current-out input terminal, and an output circuit including a current-source output terminal and a current sink output terminal, each element being adapted in response to a signal delivered to a read terminal to cause to appear at one of said output terminals a signal representing a one and at the other output terminal a signal representing a zero when both input signals represent ones, and the reverse at said output terminals when any one of the input signals represents zero, clock means for generating electrical clock pulses at a plurality of clock terminals, the pulses generated at each of said clock terminals having the same recurrence frequency as the pulses generated at any other of said clock terminals but being non-coincident in time with the pulses at said other clock terminals, whereby successive pulses from all of said clock terminals within one pulse period constitute a clock cycle, first and second of said logical elements, said first electrical signal being applied to an input terminal of said first logical element and said second electrical signal being applied to an input terminal of said second logical element, a third of said logical elements, one output terminal of each of said first and second logical elements being connected in parallel to one input terminal of the third logical element and the other output terminal of each of the first and second logical elements being connected in parallel to the other input terminal of the third logical element, means for connecting the read terminals of the first and second logical elements to a first terminal of said clock means, whereby the signals available at the output terminals of the third logical element represent respectively Exclusive-OR and Equivalence operations on simultaneous digits of said first and second numbers, a fourth of said logical elements, said fourth logical element storing the borrow term of the immediately preceding digit subtraction, a fifth of said logical elements, means for connecting the read terminals of the third, fourth and fifth logical elements to a second terminal of said clock means, the pulses of said second clock terminal occurring later in the clock cycle than the pulses of said first clock terminal, one output terminal of the first logical element being connected to one of the input terminals of the fifth logical element and one output terminal of the second logical element being connected to one of the input terminals of the fifth logical element, whereby the output signal at one of the output terminals of said fifth logical element represents a Disjunctive operation on corresponding order digits of said second number and the NOT of said first number, a sixth of said logical elements, one output terminal of each of said third and fourth logical elements being connected in parallel to one input terminal of the sixth logical element and the other output terminal of each of the third and fourth logical elements being connected in parallel to the other input terminal of the sixth logical element, whereby the signal available at one of the output terminals of the sixth logical element represents the difference between said first and second numbers, and a seventh of said logical elements, one output terminal of each of the third and fourth logical elements being connected in parallel to one input terminal of the seventh logical element and the last said output terminal of the fifth logical element being connected to the other input terminal of the seventh logical element, whereby the signal available at one of the output terminals of the seventh logical element represents the borrow term of the digits being subtracted, means for connecting the read terminal of the seventh logical element to a third terminal of said clock means, the pulses of said third clock terminal occurring later in the clock cycle than the pulses of said second clock terminal, one output terminal of the seventh logical element being connected to one input terminal of the fourth logical element, whereby the borrow term may be stored for use in the operation of subtraction on the next higher significant digits of said first and second numbers, the aforesaid connections between output terminals and input terminals of respective logical elements being further characterized in that current-source output terminals are connected only to current-in input terminals and current-sink output terminals are connected only to current-out input terminals.

4. In a digital computer for subtracting from a first binary digital number a second binary digital number, corresponding order digits of said numbers being respectively represented by first and second electrical signals, a circuit including a plurality of logical elements each having an input circuit including a current-in input terminal and a current-out input terminal, and an output circuit including a current-source output terminal and a current sink output terminal, each element being adapted to cause to appear at one of said output terminals a signal representing a one and at the other output terminal a zero when both input signals represent ones, and the reverse thereof at said output terminals when any one of the input signals represents zero, first and second of said logical elements, said first electrical signal being applied to an input terminal of said first logical element and said second electrical signal being applied to an input terminal of said second logical element, a third of said logical elements, one output terminal of each of said first and second logical elements being connected in parallel to one input terminal of the third logical element and the other output terminal of each of the first and second logical elements being connected in parallel to the other input terminal of the third logical element, whereby the signals available at the output terminals of the third logical element represent respectively Exclusive-OR and Equivalence operations on said corresponding order digits of said first and second numbers, a fourth of said logical elements, said fourth logical element storing the borrow term of the immediately preceding order digit subtraction, a fifth of said logical elements, one output terminal of the first logical element being connected to one of the input terminals of the fifth logical element and one output terminal of the second logical element being connected to one of the input terminals of the fifth logical element, whereby the output signal at one of the output terminals of said fifth logical element represents a Disjunctive operation on corresponding order digits of said second number and the NOT of said first number, a sixth of said logical elements, one output terminal of each of said third and fourth logical elements being connected in parallel to one input terminal of the sixth logical element and the other output terminal of each of the third and fourth logical elements being connected in parallel to the other input terminal of the sixth logical element, whereby the signal available at one of the output terminals of the sixth logical element represents the difference between said corresponding order digits of said first and second numbers minus the borrow term of the immediately preceding order digit subtraction, and a seventh of said logical elements, one output terminal of each of the third and fourth logical elements being connected in parallel to one input terminal of the seventh logical element and the last said output terminal of the fifth logical element being connected to the other input terminal of the seventh logical element, whereby the signal available at one of the output terminals of the seventh logical element represents the borrow term of the digits being subtracted, the aforesaid connections between output terminals and input terminals of respective logical elements being further characterized in that current-source output terminals are connected only to current-in input terminals and current-sink output terminals are connected only to current-out input terminals.

5. The computer circuit of claim 4 wherein one output terminal of the seventh logical element is connected to one input terminal of the fourth logical element, whereby the borrow term may be stored for use in the operation of subtraction on the next higher significant digits of said first and second numbers.

6. In a binary digital subtraction circuit including an Exclusive-OR logical element for receiving signals representing respectively corresponding order digits of the minuend and subtrahend and for delivering an output signal representing an Exclusive-OR operation on said corresponding order digits of said minuend and subtrahend, and further including storage means for storing the borrow term of the immediately preceding order digit subtraction and for supplying at respective output terminals signals representing said borrow term and the NOT of said borrow term, a circuit for generating the borrow term comprising means for obtaining a signal representing the NOT of the minuend, first and second logical elements, each having an input circuit including a current-in input terminal and a current-out input terminal, and an output circuit including a current-source output terminal and a current sink output terminal, the signals from the pair of output terminals of each of said first and second logical elements representing respectively Conjunctive and Disjunctive operations on signals applied to the input terminal pair of the respective logical elements, means for applying a signal representing the NOT of said minuend digit to one input terminal of said first logical element and for applying a signal representing said subtrahend digit to the other input terminal of said first logical element, whereby the signal at one of said output terminals of the first logical element represents a Disjunctive operation on corresponding order digits of said subtrahend and the NOT of said minuend, means for applying said Exclusive-OR output signal and the NOT signal of said stored borrow term in parallel to one input terminal of said second logical element, and means for applying said Disjunctive output signal of said first logical element to the other input terminal of said second logical element, whereby the Disjunctive output signal of said second logical element represents the borrow term of the digits being subtracted, the aforesaid connections between output terminals and input terminals of respective logical elements being further characterized in that current-source output terminals are connected only to current-in input terminals and current-sink output terminals are connected only to current-out input terminals.

7. The subtraction circuit as in claim 6 further including means for connecting at least one output terminal of said second logical element to said storage means.

8. A digital computer circuit for subtracting from a first binary digital number a second binary digital number, said numbers being respectively represented by first and second electrical signals, comprising means for generating electrical clock pulses at a plurality of terminals, the pulses generated at each of said terminals having the same recurrence frequency as the pulses generated at the other terminals but being non-coincident in time with the pulses at said other terminals, whereby successive pulses from all the terminals within one pulse period constitute a clock cycle; first and second functors, said first signal being applied to an input terminal of said first functor and said second signal being applied to an input terminal of said second functor; a third functor, the current source output terminals of the first and second functors being connected in parallel to one input terminal of the third functor and the current sink output terminals of the first and second functors being connected in parallel to the other input terminal of the third functor, means for connecting the read terminals of the first and second functors to a first terminal of said clock means, whereby the signals available at the output terminals of the third functor represent respectively Exclusive-OR and Equivalence operations on simultaneous digits of said first and second numbers; a fourth functor which stores the borrow term of the immediately preceding digit subtraction; a fifth functor, the read terminals of the third, fourth and fifth functors being connected to a second terminal of said clock means, the pulse output of said second clock terminal occurring later in the clock cycle than the pulse output of said first clock terminal, one of the output terminals of the first functor being connected to an input terminal of the fifth functor, and one of the output terminals of the second functor being connected to an input terminal of the fifth functor, whereby the output signal at an output terminal of said fifth functor represents a Disjunctive operation on corresponding order digits of said second number and the NOT of said first number; a sixth functor, the current source output terminals of the third and fourth functors being connected in parallel to one input terminal of the sixth functor and the current sink output terminals of the third and fourth functors being connected in parallel to the other input terminal of the sixth functor, whereby the signal available at one of the output terminals of the sixth functor represents the difference between said first and second numbers; a seventh functor, one of the output terminals of each of the third and fourth functors being connected in parallel to one of the input terminals of the seventh functor, and the last said output terminal of the fifth functor being connected to the other input terminal of the seventh functor, whereby the signal available at one of the output terminals of the seventh functor represents the borrow term of the digits being subtracted, the read terminal of the seventh functor being connected to a third terminal of said clock means, the pulse output of said third clock terminal occurring later in the clock cycle than the pulse output of said second clock terminal, one output terminal of the seventh functor being connected to one input terminal of the fourth functor, whereby the borrow term may be stored for use in the operation of subtraction on the next higher significant digits of said first and second numbers.

9. In a digital computer for subtracting from a first binary digital number a second binary number, said numbers having corresponding order digits respectively represented by first and second electrical signals, a circuit comprising first and second functors, said first signal being applied to an input terminal of said first functor and said second signal being applied to an input terminal of said second functor, a third functor, the current source output terminals of the first and second functors being connected in parallel to one input terminal of the third functor and the current sink output terminals of the first and second functors being connected in parallel to the other input terminal of the third functor, whereby the signals available at the output terminals of the third functor represent respectively Exclusive-or and Equivalence operations on said corresponding order digits of said first and second numbers, a fourth functor, which stores the borrow term of the immediately preceding digit subtraction, a fifth functor, one of the output terminals of the first functor being connected to an input terminal of the fifth functor and one of the output terminals of the second functor being connected to an input terminal of the fifth functor, whereby the output signal at an output terminal of said fifth functor represents a Disjunctive operation on corresponding order digits of said second number and the NOT of said first number, a sixth functor, the current source output terminals of the third and fourth functors being connected in parallel to one input terminal of the sixth functor and the current sink output terminals of the third and fourth functors being connected in parallel to the other input terminal of the sixth functor, whereby the signal available at one of the output terminals of the sixth functor represents the difference between said corresponding order digits of said first and second numbers minus the borrow term of the immediately preceding order digit subtraction, a seventh functor, one of the output terminals of each of the third and fourth functors being connected in parallel to one of the input terminals of the seventh functor and the last said output terminal of the fifth functor being collected to the other input terminal of the seventh functor, whereby the signal available at one of the output terminals of the seventh functor represents the borrow term of the digits being subtracted.

10. The circuit of claim 9 wherein one output terminal of the seventh functor is connected to one input terminal of the fourth functor, whereby the borrow term may be stored for use in the operation of subtraction on the next higher significant digits of said first and second numbers.

11. In a digital computer for substracting from a first binary digital number a second binary digital number, said numbers having corresponding order digits respectively represented by first and second electrical signals, a circuit comprising a binary logical element having input terminals, an Exclusive-OR output terminal, and an Equivalence output terminal, said first and second signals being applied to said input terminals; storage means for storing the borrow term of the immediately preceding order digit subtraction and for supplying as output signals at respective terminals said borrow term and the NOT of said borrow term; first, second and third functors, means for applying signals representing said second electrical signal and the NOT of said first electrical signal to the input circuit of said first functor, whereby the signal at one of the output terminals thereof represents a Disjunctive operation on corresponding order digits of said second number and the NOT of said first number; the Exclusive-OR output signal of said binary logical element and the NOT of the borrow signal of said storage means being applied in parallel to one input terminal of said second functor, and the last said output terminal of said first functor being connected to another input terminal of said second functor, whereby the output signal from the second functor represents the borrow term of the digits being subtracted; the Exclusive-OR output signal of said binary logical element and the NOT of the borrow signal of said storage means being applied in parallel to one input terminal of said third functor, and the Equivalence output signal of said binary logical element and the borrow output signal of said storage means being applied in parallel to another input terminal of said third functor, whereby the signal from an output terminal of said third functor represents the difference between said corresponding order digits of said first and second numbers minus the borrow term of the immediately preceding order digit subtraction.

12. In a binary digital subtraction circuit including means for receiving signals representing respectively corresponding order digits of the minuend and the subtrahend, and also including an Exclusive-OR logical element for receiving said signals and for delivering an output signal representing an Exclusive-OR operation on said corresponding order digits of said minuend and subtrahend, and further including storage means for storing the borrow term of the immediately preceding order digit subtraction and for supplying at respective output terminals signals representing said borrow term and the NOT of said borrow term, a circuit for generating the borrow term comprising first and second functors, means for providing a signal representing the NOT of one of said corresponding order digits of said minuend and subtrahend, means connected to the input of the first functor for producing at an output terminal thereof a signal representative of a Disjunctive operation on corresponding order digits of said subtrahend and the NOT of said minuend, the latter means including means for applying to the input of the first functor said signal representing the NOT of one of said corresponding order digits of said minuend and subtrahend and a signal representing the other of said corresponding order digits of said minuend and subtrahend, means for applying said Exclusive-OR output signal and the NOT signal of said stored borrow term in parallel to one input terminal of said second functor, and means for applying said Disjunctive output signal of said first functor to the other input terminal of said second functor, whereby the output signals of said second functor are indicative of the borrow term of the digits being subtracted.

13. The circuit as in claim 12 further including means for connecting the output of said second functor to said storage means.

14. In a digital computer for subtracting from a first binary digital number a second binary digital number, said numbers having corresponding order digits respectively represented by first and second electrical signals, a circuit comprising first to the seventh Adjunctive logical elements each having an input circuit including a current-in input terminal and a current-out input terminal, and an output circuit including a current source output terminal and a current sink output terminal, said first electrical signal being applied to one input terminal of said first logical element and said second electrical signal being applied to one input terminal of said second logical element, whereby the signals from the output terminals of said first logical element represent its input signal and the NOT of said input signal, and whereby the signals from the output terminals of said second logical element represent its input signal and the NOT of its input signal, one output terminal of each of said first and second logical elements being connected in parallel to one input terminal of said third logical element and the other output terminal of each of said first and second logical elements being connected in parallel to the other input terminal of said third logical element, whereby the signals from the output terminals of said third logical element represent respectively an Exclusive-OR and an Equivalence operation on said corresponding order digits of said first and second numbers; means including said fourth logical element for storing the borrow term of the immediately preceding order digit subtraction, whereby the signals from the output terminals of said fourth logical element represent said borrow term and the NOT of said borrow term, one output terminal of said first logical element being connected to one of the input terminals of said fifth logical element, and one output terminal of the second logical element being connected to one of the input terminals of the fifth logical element, whereby the signal from one of the output terminals of said fifth logical element represents a Disjunctive operation on corresponding order digits of said second number and the NOT of said first number, one output terminal of each of said third and fourth logical elements being connected in parallel to one input terminal of said sixth logical element, and the other output terminal of each of said third and fourth logical elements being connected in parallel to the other input terminal of said sixth logical element, whereby the signal from one of the output terminals of said sixth logical element represents the difference between said corresponding order digits of said first and second numbers minus the borrow term of the immediately preceding order digit subtraction, one output terminal of each of said third and fourth logical elements being connected in parallel to one input terminal of said seventh logical element, and the last said output terminal of said fifth logical element being connected to the other input terminal of said seventh logical element, whereby the signal from one output terminal of said seventh logical element represents the borrow term of the digits being subtracted, the aforesaid connections between output terminals and input terminals of respective logical elements being further characterized in that current-source output terminals are connected only to current-in input terminals and current-sink output terminals are connected only to current-out input terminals.

15. The computer circuit of claim 14 wherein one of the output terminals of said seventh Adjunctive logical element is connected to one of the input terminals of said fourth Adjunctive logical element whereby the borrow term may be transferred to the fourth Adjunctive logical element for use in the operation of subtraction on the next higher order digits of said first and second numbers.

16. A digital computer circuit for subtracting from a first binary digital number a second binary digital number, said numbers being respectively represented by first and second electrical signals, comprising means for generating electrical clock pulses at a plurality of terminals, the pulses generated at each of said terminals having the same recurrence frequency as the pulses generated at the other terminals but being non-coincident in time with the pulses at said other terminals, whereby successive pulses from all the terminals within one pulse period constitute a clock cycle; first and second functors, means for applying signals respectively representing said first number and a binary 1 to respective input terminals of the said first functor and means for applying signals respectively representing said second number and a binary 1 to respective input terminals of said second functor; a third functor, the current source output terminals of the first and second functors being connected in parallel to one input terminal of the third functor and the current sink output terminals of the first and second functors being connected in parallel to the other input terminal of the third functor, means for connecting the read terminals of the first and second functors to a first terminal of said clock means, whereby the signals available at the output terminals of the third functor represent respectively Exclusive-OR and Equivalence operations on simultaneous digits of said first and second numbers; a fourth functor which stores the borrow term of the immediately preceding digit subtraction; a fifth functor, the read terminals of the third, fourth and fifth functors being connected to a second terminal of said clock means, the pulse output of said second clock terminal occurring later in the clock cycle than the pulse output of said first clock terminal, one of the output terminals of the first functor being connected to an input terminal of the fifth functor, and one of the output terminals of the second functor being connected to an input terminal of the fifth functor, whereby the output signal at an output terminal of said fifth functor represents a Disjunctive operation on corresponding order digits of said second number and the NOT of said first number; a sixth functor, the current source output terminals of the third and fourth functors being connected in parallel to one input terminal of the sixth functor and the current sink output terminals of the third and fourth functors being connected in parallel to the other input terminal of the sixth functor, whereby the signal available at one of the output terminals of the sixth functor represents the difference between said first and second numbers; a seventh functor, one of the output terminals of each of the third and fourth functors being connected in parallel to one of the input terminals of the seventh functor, and the last said output terminal of the fifth functor being connected to the other input terminal of the seventh functor, whereby the signal available at one of the output terminals of the seventh functor represents the borrow term of the digits being subtracted, the read terminal of the seventh functor being connected to a third terminal of said clock means, the pulse output of said third clock terminal occurring later in the clock cycle than the pulse output of said second clock terminal, one output terminal of the seventh functor being connected to one input terminal of the fourth functor, whereby the borrow term may be stored for use in the operation of subtraction on the next higher significant digits of said first and second numbers.

17. In a digital computer for subtracting from a first binary digital number a second binary digital number, said numbers being respectively represented by electrical signals, a circuit comprising first and second functors, means for applying signals respectively representing a digit of said first number and a binary 1 to respective input terminals of the said first functor and means for applying signals respectively representing a digit of said second number and a binary 1 to respective input terminals of said second functor, said digits of said numbers being of corresponding order, a third functor, the current source output terminals of the first and second functors being connected in parallel to one input terminal of the third functor and the current sink output terminals of the first and second functors being connected in parallel to the other input terminal of the third functor, whereby the signals available at the output terminals of the third functor represent respectively Exclusive-OR and Equivalence operations on said corresponding order digits of said first and second numbers, a fourth functor, which stores the borrow term of the immediately preceding digit subtraction, a fifth functor, one of the output terminals of the first functor being connected to an input terminal of the fifth functor and one of the output terminals of the second functor being connected to an input terminal of the fifth functor, whereby the output signal at an output terminal of said fifth functor represents a Disjunctive operation on said corresponding order digits of said second number and the NOT of said first number, a sixth functor, the current source output terminals of the third and fourth functors being connected in parallel to one input terminal of the sixth functor and the current sink output terminals of the third and fourth functors being connected in parallel to the other input terminal of the sixth functor, whereby the signal available at one of the output terminals of the sixth functor represents the difference between said corresponding order digits of said first and second numbers minus the borrow term of the immediately preceding order digit subtraction, a seventh functor, one of the output terminals of each of the third and fourth functors being connected in parallel to one of the input terminals of the seventh functor and the last said output terminal of the fifth functor being connected to the other input terminal of the seventh functor, whereby the signal available at one of the output terminals of the seventh functor represents the borrow term of the digits being subtracted.

18. The circuit of claim 17 wherein one output terminal of the seventh functor is connected to one input terminal of the fourth functor, whereby the borrow term may be stored for use in the operation of subtraction on the next higher significant digits of said first and second numbers.

19. In a binary digital subtraction circuit including an Exclusive-OR logical element for receiving signals representing respectively corresponding order digits of the minuend and subtrahend and for delivering an output signal representing an Exclusive-OR operation on said corresponding order digits of said minuend and subtrahend, and further including storage means for storing the borrow term of the immediately preceding order digit subtraction and for supplying at respective output terminals signals representing said borrow term and the NOT of said borrow term, a circuit for generating the borrow term comprising means for obtaining a signal representing the NOT of one of said corresponding order digits of the minuend and subtrahend, first and second logical elements, each having an input circuit including a current-in input terminal and a current-out input terminal and an output circuit including a current-source output terminal and a current sink output terminal, the signals from the pair of output terminals of said first and second logical elements representing respectively Conjunctive and Disjunctive operations on signals applied to the input terminal pair of the respective logical elements, means connected to the input of the first logical element for producing at an output terminal thereof a signal representative of a Disjunctive operation on corresponding order digits of said subtrahend and the NOT of said minuend, the latter means including means for applying to the input of the first logical element said signal representing the NOT of one of said corresponding order digits of the minuend and subtrahend and a signal representing the other of said minuend and subtrahend, means for applying said corresponding order digits of the Exclusive-OR output signal and the NOT signal of said stored borrow term in parallel to one input terminal of said second logical element, and means for applying said Disjunctive output signal of said first logical element to the other input terminal of said second logical element, whereby the Disjunctive output signal of said second logical element represents the borrow term of the digits being subtracted, the aforesaid connections between output terminals and input terminals of respective logical elements being further characterized in that current-source output terminals are connected only to current-in input terminals and current-sink output terminals are connected only to current-out input terminals.

20. The subtraction circuit as in claim 19 further including means for connecting at least one output terminal of said second logical element to said storage means.

References Cited in the file of this patent

UNITED STATES PATENTS

| | | |
|---|---|---|
| 2,611,536 | Barrow | Sept. 23, 1952 |
| 2,673,337 | Avery | Mar. 23, 1954 |
| 2,781,504 | Canepa | Feb. 12, 1957 |
| 2,803,401 | Nelson | Aug. 20, 1957 |

FOREIGN PATENTS

| | | |
|---|---|---|
| 1,034,099 | France | Apr. 8, 1953 |

OTHER REFERENCES

Gray: Logical Description of Some Digital-Computer Adders and Counters, Proc. I.R.E., January 1952, pages 29–32.

Washburn: "An Application of Boolean Algebra to the Design of Electronic Switching Circuits," Communications and Electronics, September 1953, pages 380–388.

Gutermans et al.: Logical and Control Functions Performed with Magnetic Cores, Proc. I.R.E., March 1955, pages 291–298.